United States Patent
Herrmann et al.

(10) Patent No.: US 10,418,138 B1
(45) Date of Patent: Sep. 17, 2019

(54) METHOD OF SEPARATING AND RECOVERING URANIUM FROM ALUMINUM-CLAD METALLIC NUCLEAR FUEL

(71) Applicant: United States Department of Energy, Washington, DC (US)

(72) Inventors: Steven Herrmann, Idaho Falls, ID (US); Kevin Norbash, Albuquerque, NM (US)

(73) Assignee: U.S. Department of Enery, Washington, DC (US)

( * ) Notice: Subject to any disclaimer, the term of this patent is extended or adjusted under 35 U.S.C. 154(b) by 0 days.

(21) Appl. No.: 16/166,232

(22) Filed: Oct. 22, 2018

(51) Int. Cl.
    *C25D 3/66* (2006.01)
    *C25C 3/34* (2006.01)
    *G21C 19/48* (2006.01)

(52) U.S. Cl.
    CPC ............. *G21C 19/48* (2013.01); *C25C 3/34* (2013.01); *C25D 3/66* (2013.01)

(58) Field of Classification Search
    CPC ............. C25D 3/66; C25C 3/34; G21C 19/48
    See application file for complete search history.

(56) References Cited

U.S. PATENT DOCUMENTS 4,297,174 A * 10/1981 Brambilla ................. C25B 1/00
    205/354

* cited by examiner

*Primary Examiner* — Brian W Cohen
(74) *Attorney, Agent, or Firm* — Felisa L. Leisinger; Michael J. Dobbs; Brian J. Lally

(57) ABSTRACT

According to one aspect of the invention, a method for separating and recovering uranium from a nuclear fuel element. The method includes immersing a nuclear fuel element containing nuclear fuel and cladding in a molten metal. The nuclear fuel includes uranium. The cladding is selectively dissolved from the nuclear fuel element when immersed in the molten metal. The nuclear fuel is separated from the cladding. The method then includes loading the nuclear fuel into a permeable basket that is electrically configured as an anode of an electrolytic cell. There are also a molten salt electrolyte and a cathode in the electrolytic cell. Then, the method includes applying an electric charge across the electrolytic cell. The molten salt electrolyte selectively transfers uranium from the anode to the cathode.

17 Claims, 7 Drawing Sheets

US 10,418,138 B1

METHOD OF SEPARATING AND RECOVERING URANIUM FROM ALUMINUM-CLAD METALLIC NUCLEAR FUEL

GOVERNMENT INTERESTS

The United States Government has rights in this invention pursuant to Contract No. DE-AC07-05ID14517 between the U.S. Department of Energy (DOE) and Battelle Energy Alliance.

FIELD OF THE INVENTION

The present invention relates to the separation and recovery of uranium from aluminum-clad metallic nuclear fuel.

BACKGROUND OF THE INVENTION

In an effort to reduce the use of highly enriched uranium fuels, different programs exist to convert research reactors fueled with highly enriched uranium into those fueled by low enriched uranium. The United States Highly Enriched Uranium Reactor Conversion program used to be known as the Reduced Enrichment for Research and Test Reactors program, and it is still known as such internationally. There remains a strong emphasis in converting research reactors fueled with highly enriched uranium into those fueled by low enriched uranium. The highly enriched uranium fuel is made of aluminide, oxide, or silicide particulate dispersed in an aluminum powder and clad with aluminum. The uranium loading densities range from 2 to 5 gU/cm$^3$. Conversion to a low enriched uranium fuel, where there is less than 20% U-235, without impacting reactor performance requires a higher uranium loading density. 15.3 gU/cm$^3$ is achievable within a monolithic U—Mo fuel. Current methods to recover uranium from high-enriched fuel use an aqueous process. During this process, the presence of uranium in combination with zirconium in monolithic uranium fuel introduces explosion hazards.

The projected demand for monolithic low enriched uranium fuel within the U.S. is approximately 1,800 kg annually. Accounting for uranium losses during fabrication indicates an additional 3,000 kg monolithic low enriched uranium fuel would be required annually to meet projected demands. The used fuel and fabrication scrap are of sufficient U-235 enrichment to warrant recovery and reuse of the low enriched-uranium. Due to the high demand of low enriched uranium needed and the safety concerns associated with the aqueous process, there exists a need for a safe processing method of monolithic fuel that can meet the demand that is needed.

SUMMARY OF THE INVENTION

According to one aspect of the invention, a method for separating and recovering uranium from aluminum-clad metallic nuclear fuel is described. The method includes immersing a nuclear fuel element containing nuclear fuel and cladding in a molten metal. The nuclear fuel includes uranium. The cladding is selectively dissolved from the nuclear fuel element when immersed in the molten metal. The nuclear fuel is separated from the cladding. The method then includes loading the nuclear fuel into a permeable basket that is electrically configured as an anode of an electrolytic cell. There are also a molten salt electrolyte and a cathode in the electrolytic cell. Then, the method includes applying an electric charge across the electrolytic cell. The molten salt electrolyte selectively transfers uranium from the anode to the cathode.

According to another aspect of the invention, a method for separating uranium from a nuclear fuel element is described. The method includes immersing a nuclear fuel element containing nuclear fuel, an interlayer, and cladding in molten magnesium. The nuclear fuel is a uranium-molybdenum alloy fuel. The interlayer includes zirconium. The cladding includes aluminum. The cladding is selectively dissolved from the nuclear fuel rod when immersed in the molten magnesium. The nuclear fuel and interlayer are separated from the cladding. The method then includes loading the nuclear fuel and interlayer into a permeable basket that is electrically configured as an anode of an electrolytic cell. The electrolytic cell has a LiCl—KCl—UCl3 electrolyte and a cathode. Then, the method includes applying an electric charge across the electrolytic cell. The electrolyte selectively transfers uranium from the anode to the cathode.

BRIEF DESCRIPTION OF THE DRAWINGS

Embodiments of the present invention are illustrated in the accompanying figures where.

DETAILED DESCRIPTION OF THE INVENTION

The following detailed description provides illustrations for embodiments of the present invention. Each example is provided by way of explanation of the present invention, not limitation of the present invention. Those skilled in the art will recognize that other embodiments for carrying out or practicing the present invention are also possible. Therefore, it is intended that the present invention covers such modifications and variations as come within the scope of the appended claims and their equivalents.

Figure 1:
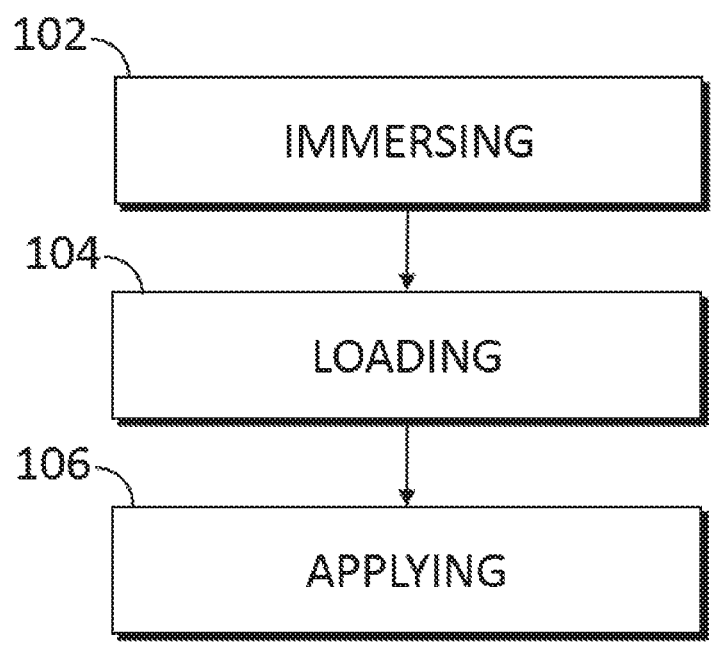
FIG. 1 is a flowchart illustrating a method according to an embodiment of this invention.
Figure 2:
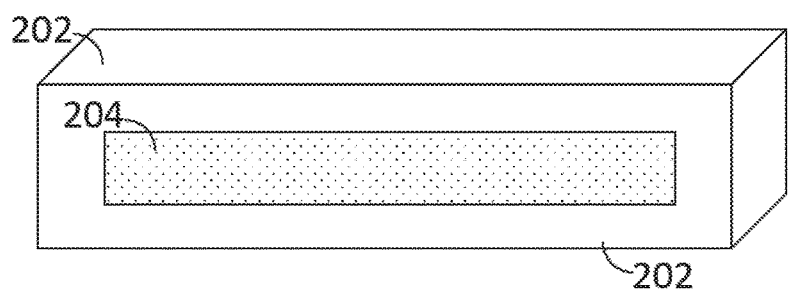
FIG. 2 is a schematic illustration of fuel element according to an embodiment of this invention.
Figure 3:
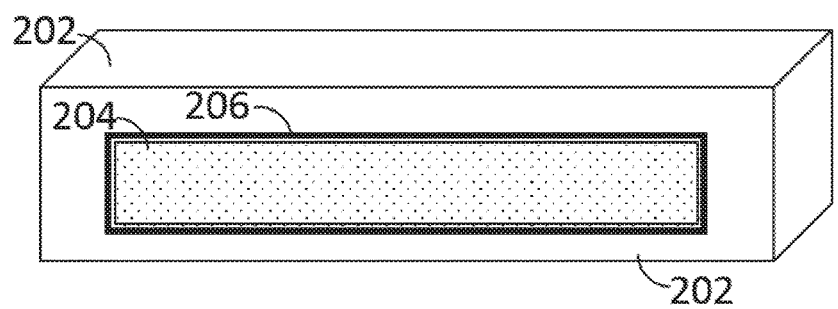
FIG. 3 is a schematic illustration of a fuel element according to an embodiment of this invention.

Referring to FIG. 1, a flowchart illustrating a method 100 of separating and recovering uranium from a nuclear fuel rod is shown. A nuclear fuel element is immersed 102 into a molten metal. As shown in FIG. 2, the nuclear fuel element 200 contains nuclear fuel 202 and cladding 204. The nuclear fuel element 200 can be any nuclear fuel assembly, not limited to a specific shape. The fuel element 200 may be cylindrical or it may be an orthotope. The nuclear fuel 202 includes uranium and the nuclear fuel 202 may be monolithic. The nuclear fuel 202 may be irradiated or unirradiated. The nuclear fuel 202 may be a highly enriched uranium fuel. The nuclear fuel 202 may include fission products. In an embodiment, the nuclear fuel 202 is a monolithic uranium-molybdenum alloy fuel. In an embodiment, the cladding 204 contains aluminum or an aluminum alloy. FIG. 3 shows an embodiment of the nuclear fuel element 200 having an interlayer 206 between the nuclear fuel 202 and the cladding 204. In an embodiment, the interlayer 206 is a zirconium interlayer.

Returning to FIG. 1, the molten metal is a liquid metal that can maintain the nuclear fuel in a metallic state while selectively dissolving the cladding. The molten metal targets the cladding for dissolution. In any embodiment, the cladding is soluble in the molten metal, but the nuclear fuel is not soluble in the molten metal. The molten metal has a melting point approximately below or near that of the cladding. In an embodiment where the cladding contains aluminum, the temperature of the molten metal is approximately 700° C.

In an embodiment where the molten metal is molten magnesium, the melting point of magnesium is 650° C. and produces a molten Al—Mg alloy below 700° C. Further, magnesium does not interact with uranium, molybdenum, or zirconium; meaning the nuclear fuel, and associated interlayer if present, would be undisturbed. In an embodiment where the molten metal is molten lithium, the melting point of lithium is 180° C. and produces a molten Al—Li alloy below 700° C. Similarly, lithium does not interact with uranium, molybdenum, or zirconium; meaning the nuclear fuel, and associated interlayer if present, would be undisturbed.

When the nuclear fuel element is immersed 102 in the molten metal, the cladding is dissolved from the nuclear fuel element. When dissolved, the cladding forms a molten alloy with the molten metal and the nuclear fuel is separated from the cladding, leaving the nuclear fuel substantially free of cladding. Substantially free of cladding means that most, at least approximately 60%, of the cladding is removed from the nuclear fuel. Preferably, approximately 90% of the cladding is removed from the nuclear fuel. In an embodiment, the nuclear fuel is dried after immersing the nuclear fuel rod into the molten metal. The nuclear fuel would be dried through a vacuum distillation or any method that provides acceptable results.

In prior art methods of using an aqueous solution to remove cladding, explosion hazards existed, especially if there was a zirconium interlayer. In prior art methods, the outcomes were poor due to oxidation of the metal fuel matrix in an aqueous solution, which inhibited the subsequent recovery of uranium metal. The present invention does not pose an explosion hazard because the molten metal does not interact with the nuclear fuel or the interlayer. The present invention causes no oxidation of the nuclear fuel. Unlike prior art methods, where a caustic dissolution is used to remove an aluminum cladding, the present invention is safer and more effective.

Figure 4:
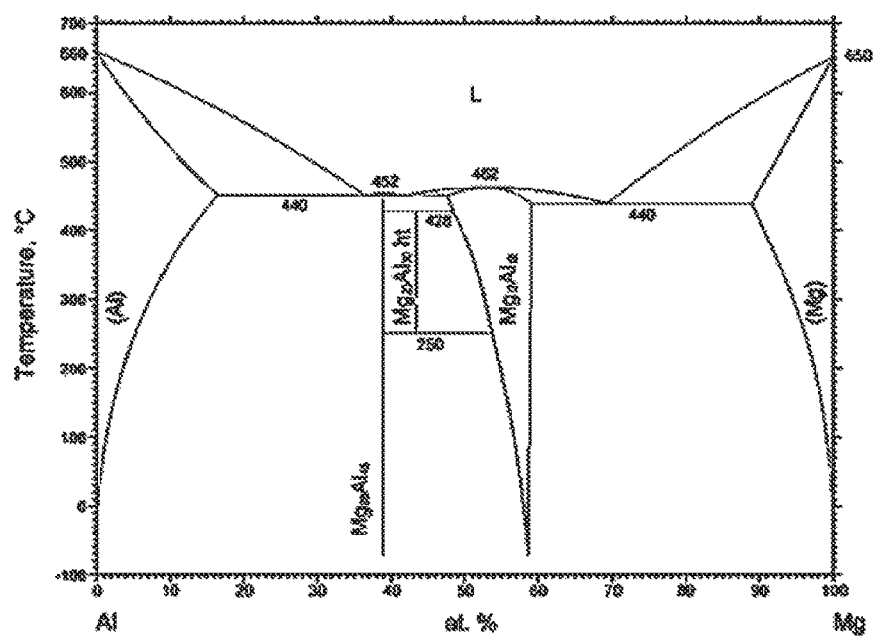
FIG. 4 is a phase diagram for aluminum and magnesium.
Figure 5:
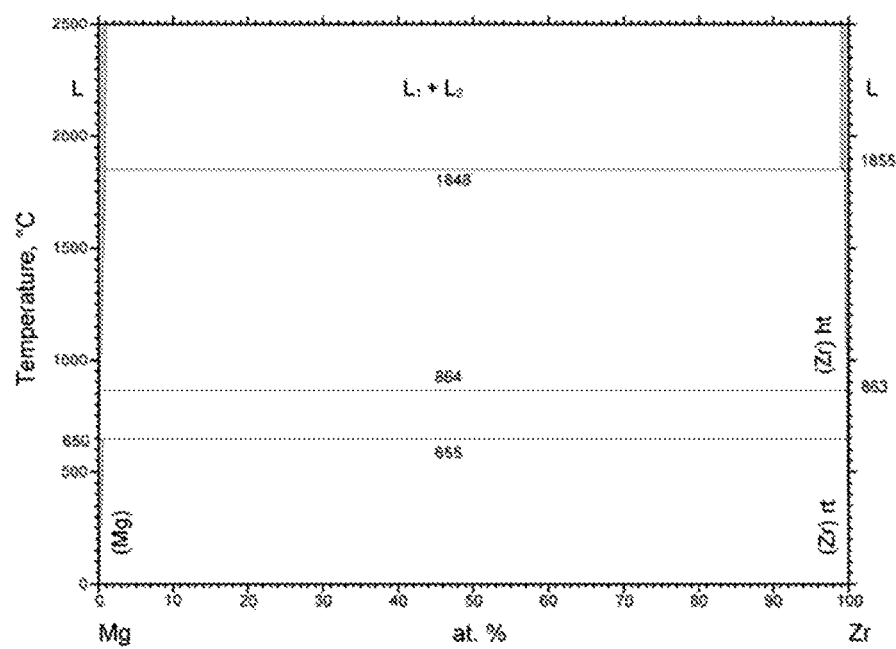
FIG. 5 is a phase diagram for magnesium and zirconium.
Figure 6:
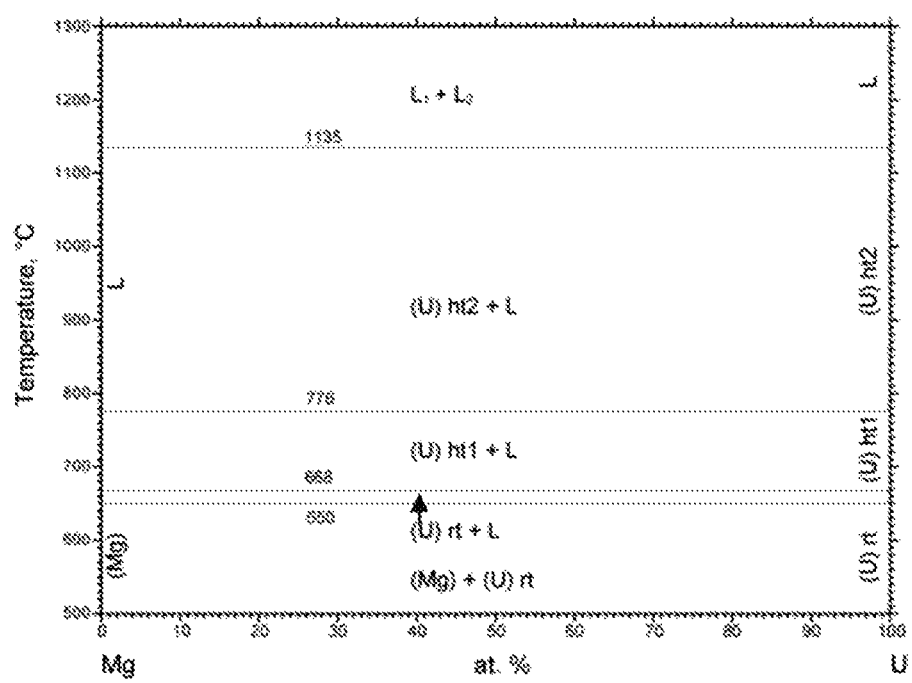
FIG. 6 is a phase diagram for magnesium and uranium.
Figure 7:
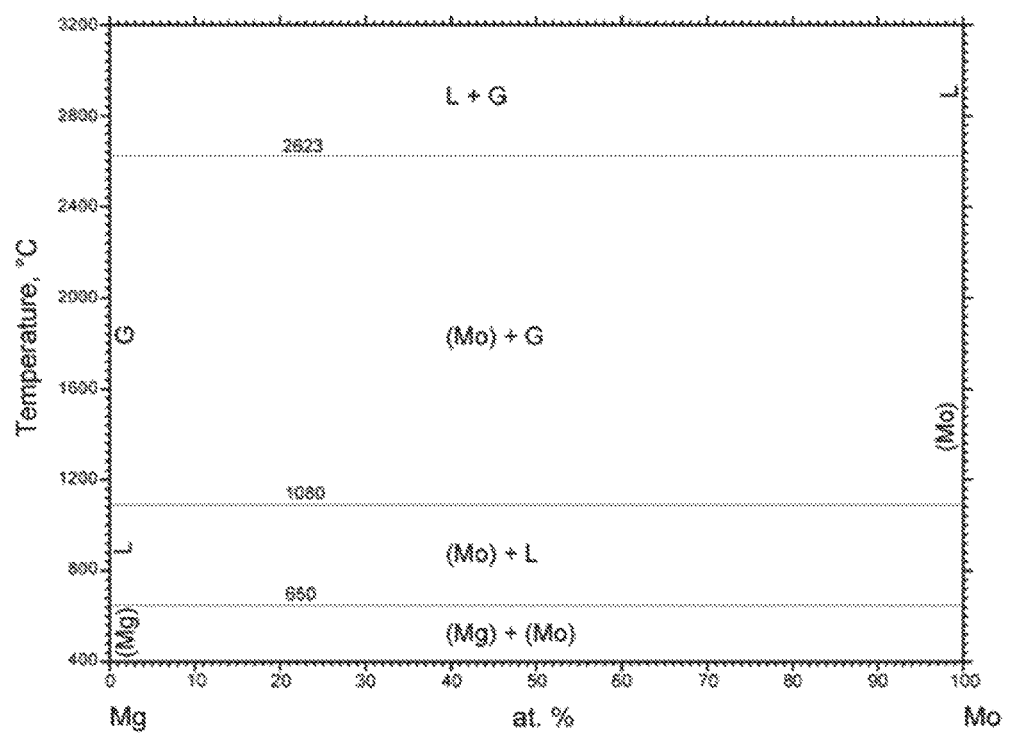
FIG. 7 is a phase diagram for magnesium and molybdenum.

In an experiment, five strips of aluminum clad U—Mo alloy fuel were used. The five strips were approximately 2 in long, ¼ in wide, and 0.6 in thick. The strips were immersed in a molten magnesium at 700° C. FIG. 4 shows the phase diagram for aluminum in magnesium. As shown in the phase diagram, aluminum is soluble in magnesium. FIG. 5, FIG. 6, and FIG. 7 show the phase diagrams for magnesium in zirconium, uranium and molybdenum, respectfully. As these diagrams depict, and as the experiment confirmed, magnesium is not soluble in zirconium, uranium and molybdenum. In application, this resulted in the aluminum cladding dissolving within a matter of seconds after contacting the molten magnesium. The U—Mo alloy fuel strips were left intact and undisturbed by the removal process of the cladding.

The nuclear fuel is loaded 104 into a permeable basket. The permeable basket is electrically configured as an anode within an electrolytic cell. The anode is the electrode through which an electric current flows within a polarized electrolytic cell. The anode is where the chemical oxidation occurs. The anode is made from an electrically conductive or semiconductive material. In an embodiment the anode is a metal basket. For example, the anode may be made from stainless steel.

The electrolytic cell also has a molten salt electrolyte and a cathode. The molten salt electrolyte is any liquid salt electrolyte that is ion selective towards uranium. The molten salt electrolyte could include various combinations of molten halides, as long as the companion uranium trihalide is present within the molten salt electrolyte. In some embodiments, the molten salt electrolyte is a combination of the same halide. For example, the halide can be chloride. Or the halide can include alkali chlorides (i.e., LiCl, KCl, NaCl). The molten salt electrolyte can be $LiCl—KCl—UCl_3$. The cathode is the electrode through which an electric current flows to within a polarized electrolytic cell. The cathode is where the chemical reduction occurs. The cathode is made from an electrically conductive or semiconductive material. In an embodiment the cathode is a metal rod. For example, the cathode may be made from stainless steel.

When an electric charge is applied 106 across the cell, the molten salt electrolyte selectively transfers uranium from the anode to the cathode. The electric charge can be a controlled current or controlled electric potential. The molten salt electrolyte oxidizes the uranium ions at the anode when the electric charge is applied. The molten salt electrolyte will selectively filter out contaminates by only transferring uranium to the cathode. The molten salt electrolyte reduces the uranium ions at the cathode to uranium metal. The cathode deposit of uranium metal is separated from the molten salt electrolyte. Separation can be by lifting the cathode from the molten salt electrolyte or by removing the molten salt electrolyte from the cell. The separated uranium is devoid of other fuel constituents. Other fuel constituents include fission products, alloying agents, remnant cladding pieces, or other non-nuclear fuel parts of the nuclear fuel element. In an embodiment, the uranium at the cathode is recovered and used for fabrication in a low enriched uranium fuel. Low enriched uranium fuel is uranium fuel with less than approximately a 20% enrichment of U-235.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

The invention claimed is:

1. A method for separating and recovering uranium from a nuclear fuel element, the method comprising:
   (a) immersing a nuclear fuel element having a nuclear fuel and a cladding in a molten metal wherein the molten metal is molten magnesium or molten lithium, the nuclear fuel including uranium, wherein the cladding is selectively dissolved from the nuclear fuel element when contacted by the molten metal thereby leaving the nuclear fuel;
   (b) loading the nuclear fuel into a permeable basket, the permeable basket is electrically configured as an anode of an electrolytic cell, the electrolytic cell having a molten salt electrolyte and a cathode; and (c) applying an electric charge across the electrolytic cell thereby causing the molten salt electrolyte to selectively transfer uranium from the anode to the cathode.

2. The method of claim 1 wherein the nuclear fuel is a monolithic uranium-molybdenum nuclear fuel.

3. The method of claim 1 wherein the nuclear fuel is a high enriched uranium fuel.

4. The method of claim 1 wherein the nuclear fuel is a mixture of uranium and other fission products.

5. The method of claim 1 wherein the cladding contains aluminum.

6. The method of claim 1 wherein the nuclear fuel element further includes a zirconium interface layer located between the nuclear fuel and the cladding.

7. The method of claim 1 wherein the nuclear fuel remains in a metallic state following the separation of the cladding.

8. The method of claim 1 wherein the molten metal has a melting point approximately at or below the melting point of the cladding.

9. The method of claim 1 wherein the electrolyte is molten $LiCl\text{—}KCl\text{—}UCl_3$.

10. The method of claim 1 wherein the uranium transferred to the cathode is free of other fuel constituents.

11. The method of claim 1 wherein the uranium transferred to the cathode is free of fission products.

12. The method of claim 1 additionally comprising the step of:

(a) drying residual molten metal from the nuclear fuel after immersing the nuclear fuel element into a molten metal.

13. The method of claim 1 additionally comprising the step of:

a) using the uranium recovered at the cathode for fabrication into a low enriched uranium nuclear fuel.

14. A method for separating and recovering uranium from a nuclear fuel element, the method comprising:

(a) immersing a nuclear fuel element having nuclear fuel, an interlayer, and a cladding in molten magnesium, the nuclear fuel being a uranium-molybdenum alloy fuel, the interlayer including zirconium, the cladding including aluminum, wherein the cladding is selectively dissolved from the nuclear fuel element when contacted by the molten magnesium thereby leaving the nuclear fuel and interlayer intact;

(b) loading the nuclear fuel and interlayer into a permeable basket, the permeable basket is electrically configured as an anode of an electrolytic cell, the electrolytic cell having a $LiCl\text{—}KCl\text{—}UCl_3$ electrolyte and a cathode; and (c) applying an electric charge across the electrolytic cell thereby causing the electrolyte to selectively transfer uranium from the anode to the cathode.

15. The method of claim 1 wherein the molten magnesium has a melting point approximately equal to the melting point of the cladding.

16. The method of claim 1 additionally comprising the step of:

(e) drying residual molten magnesium from the nuclear fuel and interlayer after immersing the nuclear fuel element into the molten magnesium.

17. The method of claim 14 additionally comprising the step of:

e) using the uranium recovered at the cathode for fabrication into a low enriched uranium nuclear fuel.

* * * * *